United States Patent Office 3,528,552
Patented Sept. 15, 1970

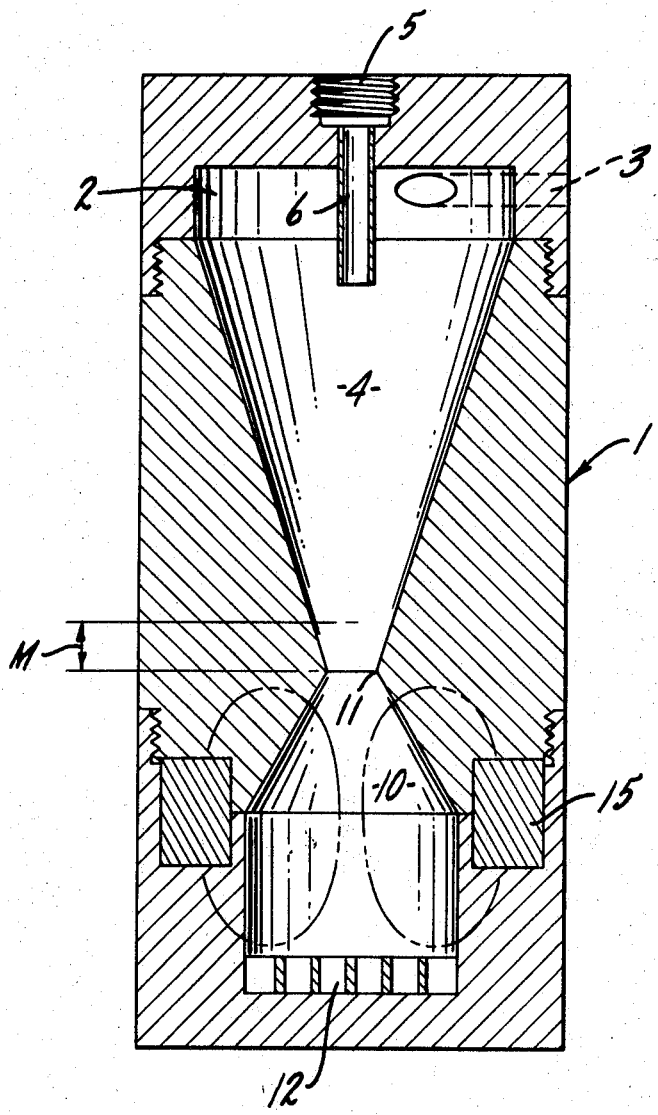

3,528,552
HYDROCYCLONIC SEPARATOR
Albert E. Martin, Silver Spring, Md., assignor to Marvel Engineering Company, Chicago, Ill., a corporation of Delaware
Filed July 24, 1969, Ser. No. 844,498
Int. Cl. B03c 1/30; B04c 9/00
U.S. Cl. 210—223                               1 Claim

ABSTRACT OF THE DISCLOSURE

A hydrocyclonic separator having an electromagnetic field adjacent the separation zone for assured separation of deleterious particles.

SUMMARY OF THE INVENTION

A hydrocyclonic separator includes a vortex forming conic section, a reverse cone section and a separation zone at the throat or junction of the two sections. An electromagnetic winding surrounds the area at or adjacent the separation zone to draw magnetizable deleterious particles from the main and marginal separation zones to prevent reentrainment of particles and to aid in removal of such particles from the receiving sump.

This invention relates to hydrocyclonic separators and has as one of its purposes the provision of means assuring separation of magnetizable deleterious particles from the fluid to be filtered.

Another purpose is to provide continuous removal of such particles from the marginal separation zone of the separator.

Another purpose is to prevent reentrainment of particles in the separator mainstream.

Another purpose is to facilitate cleaning of the sump of the separator.

Another purpose is to provide an electromagnetic field near the zone of separation in a hydrocyclonic separator, which field shall be effective to attract particles from the main and marginal separation zones to prevent reentrainment of said particles and to facilitate the cleaning thereof from a receiving sump.

Other purpose may appear from time to time during the course of the specification and claims.

DESCRIPTION OF THE DISCLOSURE

The invention is illustrated more or less diagrammatically in the accompanying drawing wherein:

The figure is a side elevation in partial cross section.

Like parts are indicated by like numerals throughout the specification and drawings.

DESCRIPTION OF THE PREFERRED EMBODIMENT

Refering now to the drawing, the numeral 1 generally designates a housing. The housing 1 has a cylindrical inlet chamber 2 adjacent its upermost area as the parts are shown. A tangential inlet 3 communicates with the chamber 2. A downwardly, as the parts are shown, frusto-conical primary conic separator section 4 joins the chamber 2. An outlet 5 for filtered fluid is positioned axially of the cone 4 at the upper portion of chamber 2. A vortex finder tube 6 may extend a distance into cone 4 from outlet 5. A reverse frusto-conical section 10 has its smaller diameter communicating with the smaller diameter of cone 4 to form a throat and separation zone 11. A receiving sump chamber 12, as the parts are shown, is formed beneath the section 10.

An electromagnetic winding 15 surrounds a portion of the section 10 and sump 12.

The use and operation of the invention are as follows:

Fluid delivered under pressure at inlet 3 flows circuitously within chamber 2 and down through the conic section 4. The circuitous flow in chamber 2 and cone 4 is productive of a centrifugal force on the fluid and on the deleterious particles to be filtrated therefrom. It will be understood that the weight of the particles sought to be separated, the fluid viscosiy and other factors will influence the level of centrifugal forces required.

Cleansed fluid escapes from conic section 4 upward through an axial vortex to outlet 5.

Deleterious particles carried by the fluid entering inlet 3 are thus forced outwardly by the centrifugal forces thus created and downwardly by the centrifugal fluid flow for expulsion through the throat or apex 11. The reverse cone 10 extends downwardly, as the parts are shown, from the throat 11 to the cylindrical sump 12 of substantially greater diameter than the throat 11. The particles and fluid received in sump 12 are quiescent, enabling the particles to settle out on the bottom of the sump, the reverse cone 10 and sump 12 thus preventing collection or buildup of deleterious particles at the throat 11.

The area at throat 11 may be considered a separation zone. Depending upon the centrifugal forces involved, the nature and viscosity of the fluid, the angles of the walls of cones 4 and 10, the diameter of throat 11, etc., the separation zone will include a point of primary or main separation at the throat 11 and a marginal zone immediately above and adjacent thereto, as shown at M in FIG. 1. The provision of the expansion area formed by cone 10 and sump 12 prevents buildup of particles at the throat 11 and consequent reentrainment or resuspension of the particles in the fluid.

The electromagnetic coil 15, productive of the magnetic field illustrated in dotted lines in FIG. 1 further facilitates a positive separation of additional particles and serves to draw them from the main separation zone and also from the marginal zone of separation through the main zone. It thus further precludes reentrainment or resuspension of such particles in the fluid. By gathering and holding particles affected by the magnetic field, quiescence is faciltated for such particles and cleansing of the sump is rendered easier.

The embodiments of the invention in which an exclusive property or privilege is claimed are defined as follows:

1. A hydrocyclonic separator including first and second conic chambers communicating at their point of smallest diameters and forming at said point a primary separation zone and forming in said first conic chamber adjacent said point a marginal separation zone, and means forming a magnetic field in said second chamber beyond said point whereby said field is positioned to attract magnetizable particles from said marginal zone through said primary zone and into said second chamber, and a sump communicating with said second chamber, said magnetic field extending into said sump.

References Cited
UNITED STATES PATENTS
3,235,090   2/1966   Bose et al. _____ 210—512

FOREIGN PATENTS
859,241   12/1952   Germany.
622,632   5/1949   Great Britain.

J. L. DeCESARE, Primary Examiner

U.S. Cl. X.R.
210—512